United States Patent
Horiguchi et al.

(10) Patent No.: US 12,071,152 B2
(45) Date of Patent: Aug. 27, 2024

(54) DRIVING SUPPORT APPARATUS

(71) Applicant: SUBARU CORPORATION, Tokyo (JP)

(72) Inventors: Harunobu Horiguchi, Tokyo (JP); Satoru Kuwahara, Tokyo (JP); Makoto Sonoki, Tokyo (JP); Yohei Kawashima, Tokyo (JP); Hideo Yagata, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 247 days.

(21) Appl. No.: 17/853,172

(22) Filed: Jun. 29, 2022

(65) Prior Publication Data

US 2023/0013377 A1    Jan. 19, 2023

(30) Foreign Application Priority Data

Jul. 16, 2021   (JP) .................... 2021-118235

(51) Int. Cl.
*B60W 50/12*   (2012.01)
*B60W 50/10*   (2012.01)

(52) U.S. Cl.
CPC ........... *B60W 50/12* (2013.01); *B60W 50/10* (2013.01); *B60W 2510/18* (2013.01); *B60W 2520/14* (2013.01); *B60W 2520/40* (2013.01); *B60W 2552/15* (2020.02)

(58) Field of Classification Search
CPC .. B60W 50/12; B60W 50/10; B60W 2510/18; B60W 2520/14; B60W 2520/40; B60W 2552/15; B60W 30/18118; B60W 2520/26; B60W 2520/28; B60W 2720/30; Y02T 10/72

USPC ........................................ 701/1, 70
See application file for complete search history.

(56) References Cited

U.S. PATENT DOCUMENTS

| | | | | |
|---|---|---|---|---|
| 5,788,005 A * | 8/1998 | Arai | ............ | B60K 28/16 180/65.6 |
| 5,832,400 A * | 11/1998 | Takahashi | ......... | B60W 30/1819 701/53 |
| 5,927,425 A * | 7/1999 | Kusano | ................ | B60K 28/165 180/248 |
| 6,205,379 B1 * | 3/2001 | Morisawa | ............... | B60L 50/16 180/165 |
| 6,349,782 B1 * | 2/2002 | Sekiya | ..................... | B60K 6/48 903/917 |
| 6,528,959 B2 * | 3/2003 | Kitano | .................. | B60T 8/1769 318/58 |

(Continued)

FOREIGN PATENT DOCUMENTS

JP        2017-094862 A       6/2017

*Primary Examiner* — Jaime Figueroa
(74) *Attorney, Agent, or Firm* — Rimon P.C.

(57) ABSTRACT

A driving support apparatus includes a drive source, a brake detector, a vehicle velocity detector, a wheel velocity detector, and a driving force controller. The drive source is configured to give driving force to each of drive wheels capable of being independently driven. The brake detector is configured to detect depression of a brake pedal. The vehicle velocity detector is configured to detect vehicle velocity of a vehicle. The wheel velocity detector is configured to detect wheel velocity of each of the drive wheels. The driving force controller is configured to control the driving force for each of the drive wheels.

11 Claims, 11 Drawing Sheets

(56) References Cited

U.S. PATENT DOCUMENTS

| | | | | |
|---|---|---|---|---|
| 6,617,703 B2* | 9/2003 | Matsubara | B60K 6/50 | 290/40 C |
| 7,206,702 B2* | 4/2007 | Isono | B60T 8/172 | 702/41 |
| 7,412,317 B2* | 8/2008 | Takamatsu | B60W 10/10 | 701/84 |
| 7,739,022 B2* | 6/2010 | Kobayashi | B60T 7/22 | 701/48 |
| 7,826,970 B2* | 11/2010 | Kobayashi | B60T 7/22 | 701/70 |
| 8,145,389 B2* | 3/2012 | Kobayashi | B60K 31/0008 | 701/36 |
| 8,204,666 B2* | 6/2012 | Takeuchi | B60K 28/06 | 701/70 |
| 8,359,155 B2* | 1/2013 | Kimura | B62D 15/025 | 340/436 |
| 8,386,119 B2* | 2/2013 | Kobayashi | B60G 17/08 | 340/576 |
| 8,554,436 B2* | 10/2013 | Kobayashi | B60W 50/16 | 701/70 |
| 8,855,881 B2* | 10/2014 | Kobayashi | B60K 31/0008 | 701/96 |
| 9,193,339 B2* | 11/2015 | Yao | B60T 8/3215 | |
| 10,654,470 B2* | 5/2020 | Sato | B60W 30/18145 | |
| 2002/0041167 A1* | 4/2002 | Kitano | B60T 8/1769 | 318/3 |
| 2005/0012501 A1* | 1/2005 | Isono | B60T 8/172 | 324/300 |
| 2005/0137769 A1* | 6/2005 | Takamatsu | B60T 7/22 | 701/1 |
| 2005/0154506 A1* | 7/2005 | Takamatsu | B60W 40/02 | 701/1 |
| 2006/0195245 A1* | 8/2006 | Kobayashi | B60K 31/0008 | 701/1 |
| 2007/0142987 A1* | 6/2007 | Takamatsu | B60W 30/00 | 701/41 |
| 2007/0145818 A1* | 6/2007 | Kobayashi | B60T 7/22 | 701/70 |
| 2007/0150118 A1* | 6/2007 | Takamatsu | B60W 40/02 | 701/1 |
| 2009/0234550 A1* | 9/2009 | Takeuchi | B60W 30/18009 | 701/70 |
| 2009/0261649 A1* | 10/2009 | Higuma | B60T 8/4275 | 303/113.3 |
| 2010/0222965 A1* | 9/2010 | Kimura | B62D 15/025 | 701/1 |
| 2012/0101702 A1* | 4/2012 | Kobayashi | B60K 31/0008 | 701/70 |
| 2013/0030666 A1* | 1/2013 | Kato | B60W 30/18027 | 701/70 |
| 2016/0243939 A1* | 8/2016 | Kawasaki | B60K 17/35 | |
| 2017/0057493 A1* | 3/2017 | Sato | B60W 30/02 | |
| 2021/0188252 A1* | 6/2021 | Lu | B60W 40/12 | |
| 2024/0017704 A1* | 1/2024 | Ozawa | B60T 8/28 | |

\* cited by examiner

FIG. 8A

| SLIP DISTRIBUTION | | RIGHT STEERING | | LEFT STEERING | |
|---|---|---|---|---|---|
| WHEEL Fl | WHEEL Fr | LOW | MEDIUM | MEDIUM | LOW |
| WHEEL Rl | WHEEL Rr | MEDIUM | HIGH | HIGH | MEDIUM |

FIG. 8B

| SLIP DISTRIBUTION | | CLOCKWISE YAW RATE | | COUNTERCLOCKWISE YAW RATE | |
|---|---|---|---|---|---|
| COUNTER-STEERING DIRECTION | | LEFT | | RIGHT | |
| WHEEL Fl | WHEEL Fr | MEDIUM | LOW | LOW | MEDIUM |
| WHEEL Rl | WHEEL Rr | HIGH | MEDIUM | MEDIUM | HIGH |

FIG. 9A

| SLIP DISTRIBUTION | | RIGHT STEERING | | LEFT STEERING | |
|---|---|---|---|---|---|
| WHEEL Fl | WHEEL Fr | LOW | MEDIUM | MEDIUM | LOW |
| WHEEL Rl | WHEEL Rr | LOW | MEDIUM | MEDIUM | LOW |

FIG. 9B

| SLIP DISTRIBUTION | | CLOCKWISE YAW RATE | | COUNTERCLOCKWISE YAW RATE | |
|---|---|---|---|---|---|
| STEERING DIRECTION | | RIGHT | | LEFT | |
| WHEEL Fl | WHEEL Fr | LOW | MEDIUM | MEDIUM | LOW |
| WHEEL Rl | WHEEL Rr | LOW | MEDIUM | MEDIUM | LOW |

DRIVING SUPPORT APPARATUS

CROSS-REFERENCE TO RELATED APPLICATIONS

The present application claims priority from Japanese Patent Application No. 2021-118235 filed on Jul. 16, 2021, the entire contents of which are hereby incorporated by reference.

BACKGROUND

The disclosure relates to a driving support apparatus that, if downward sliding occurs while a driver is attempting to stop a vehicle on a slope by depressing a brake pedal, generates driving torque for restoring grip of drive wheels against braking torque applied by the driver.

In general, when a driver attempts to stop a vehicle that is ascending or descending a slope having a very low-μ surface (a surface with a low coefficient of friction, such as that of a snow-covered road or an icy road), the driver slowly and cautiously depresses a brake pedal to decelerate the vehicle gradually without letting wheels lock up.

If a weight component (mg·sin θ) of the vehicle (mass m) along the slope (surface gradient θ) at a time when the vehicle is stopped on the slope exceeds a coefficient of static friction μ of the slope, the wheels lock up and the vehicle slides down (downward sliding).

When a vehicle slides down, a driver might be too panicked to pump a brake pedal or step on an accelerator lightly (give driving force) to recover from wheel lockup, and keep depressing the brake pedal.

Downward sliding on a slope is not limited to linear sliding. Depending on a shape of a surface (e.g., a case where there is a transverse gradient) or differences in the coefficient of static fraction μ at positions at which four wheels are in contact with a surface (split-μ surface), a vehicle might have a natural yaw rate, and an orientation of the vehicle might gradually change. Even if a driver turns a steering wheel to correct the orientation of the vehicle at this time, lateral force is not generated when steered wheels lock up and tire grip has not been restored. The driver might therefore become more panicked and anxious.

Japanese Unexamined Patent Application Publication (JP-A) No. 2017-94862, for example, discloses a technique in which, when a driver depresses a brake pedal and a control unit detects a stop of a vehicle on a slope, a braking apparatus is activated to maintain braking force based on brake fluid pressure. If the control unit detects a yaw angle larger than a certain value acting on the vehicle at this time, braking force of a left or right wheel is reduced and a left-right difference is generated in braking force in accordance with whether the vehicle has been descending or ascending the slope when stopped and a direction in which the yaw angle has been generated on the vehicle in relation to the slope, in order to suppress generation of a yaw angle.

SUMMARY

An aspect of the disclosure provides a driving support apparatus to be applied to a vehicle. The driving support apparatus includes a drive source, a brake detector, a vehicle velocity detector, a wheel velocity detector, and a driving force controller. The drive source is configured to give driving force to each of drive wheels of the vehicle. Each of the drive wheels is capable of being independently driven. The drive wheels include front wheels and rear wheels of the vehicle. The brake detector is configured to detect depression of a brake pedal of the vehicle. The vehicle velocity detector is configured to detect vehicle velocity of the vehicle. The wheel velocity detector is configured to detect wheel velocity of each of the drive wheels. The driving force controller is configured to control the driving force for each of the drive wheels. The driving force controller includes a downward sliding determiner, a braking torque estimator, a slip ratio setter, and a driving torque setter. In a case where the depression of the brake pedal is detected by the brake detector, the downward sliding determiner is configured to determine whether the vehicle is sliding down, on a basis of a relationship between the wheel velocity and the vehicle velocity. The braking torque estimator is configured to estimate, in a case where the downward sliding determiner determines that the vehicle is sliding down, braking torque acting on each of the drive wheels. The slip ratio setter is configured to set, in a case where the downward sliding determiner determines that the vehicle is sliding down, a slip ratio of each of the drive wheels on a basis of slip distribution set in advance. The driving torque setter is configured to set, on a basis of the slip ratio of each of the drive wheels set by the slip ratio setter, driving torque for driving each of the drive wheels against the braking torque estimated by the braking torque estimator.

An aspect of the disclosure provides a driving support apparatus to be applied to a vehicle. The driving support apparatus includes one or more of an electric motor and an engine, a brake sensor, and circuitry. The one or more of an electric motor and an engine are configured to give driving force to each of drive wheels of the vehicle. Each of the drive wheels is capable of being independently driven. The brake sensor is configured to detect depression of a brake pedal of the vehicle. The circuitry is configured to receive or detect vehicle velocity of the vehicle, receive or detect wheel velocity of each of the drive wheels, and control the driving force for each of the drive wheels. In a case where the depression of the brake pedal is detected by the brake detector, the circuitry is configured to determine whether the vehicle is sliding down, on a basis of a relationship between the wheel velocity and the vehicle velocity. The circuitry is configured to estimate, in a case where it is determined that the vehicle is sliding down, braking torque acting on each of the drive wheels. The circuitry is configured to set, in a case where it is determined that the vehicle is sliding down, a slip ratio of each of the drive wheels on a basis of slip distribution set in advance. The circuitry is configured to set, on a basis of the set slip ratio of each of the drive wheels, driving torque for driving each of the drive wheels against the estimated braking torque.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

FIG. 8A is a table indicating slip distribution of each wheel set when a driver makes a steering input during forward and downward sliding;

FIG. 8B is a table indicating a steering direction and slip distribution of each wheel set when a natural yaw rate is caused during forward and downward sliding;

FIG. 9A is a table indicating slip distribution of each wheel set when the driver makes a steering input during backward and downward sliding;

FIG. 9B is a table indicating a steering direction and slip distribution of each wheel set when a natural yaw rate is caused during backward and downward sliding;

DETAILED DESCRIPTION

The technique disclosed in JP-A No. 2017-94862 is not available in a vehicle that is not equipped with a braking apparatus that maintains braking force.

In addition, the technique disclosed in JP-A No. 2017-94862 merely suppresses generation of a yaw angle by reducing brake fluid pressure maintained by the braking apparatus and giving a left-right difference in braking force. It is therefore difficult to guide a sliding vehicle to a direction intended by a driver, and there are limits to suppression of the driver's state of panic and reduction of the driver's anxiety.

It is desirable to provide a driving support apparatus capable of guiding a vehicle to a direction intended by a driver even if downward sliding occurs while the vehicle is being stopped on a slope having low-$\mu$ surface, so that the driver is less likely to be panicked by the downward sliding and the driver's anxiety can be reduced.

An embodiment of the disclosure will be described hereinafter on the basis of the drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
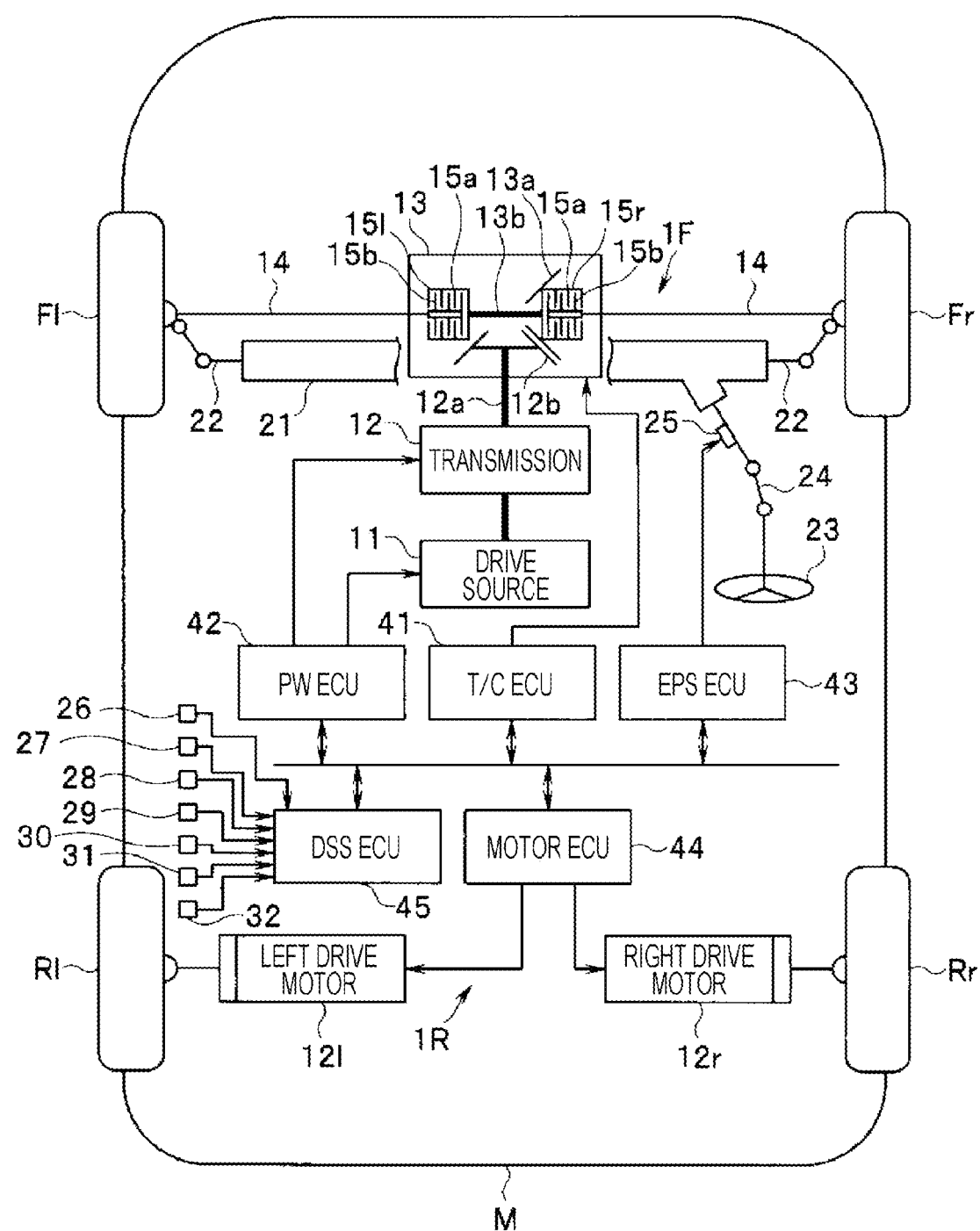
FIG. 1 is a schematic diagram of the configuration of a driving support apparatus according to an embodiment of the disclosure.

A vehicle M illustrated in FIG. 1 includes a drive system, a steering system, and a control system. The drive system is four-wheel drive achieved by a front drive unit 1F and a rear drive unit 1R. In the front drive unit 1F, an output of a drive source 11, which is usually an electric motor or an engine, is transferred to left and right front drive wheels Fl and Fr through an output shaft 12a of a transmission 12, a front differential mechanism (front differential) 13, and left and right axles 14.

The front differential 13 includes a ring gear 13a engaged with a drive bevel pinion gear 12b provided for the output shaft 12a. Both ends of a ring gear shaft 13b supporting the ring gear 13a and the left and right axles 14 are coupled to each other through left and right multi-plate clutches (wet multi-plate clutches) 15l and 15r, respectively. In the left and right multi-plate clutches 15l and 15r, outer plates 15a and inner plates 15b are alternately provided. The outer plates 15a are coupled to the ring gear shaft 13b, and the inner plates 15b are coupled to the left or right axle 14.

The outer plates 15a and the inner plates 15b of the multi-plate clutches 15l and 15r are constantly in a half-clutch state. Differential motion caused between the left and right front drive wheels Fl and Fr when the vehicle is rounding on a curve is absorbed by drag torque. A transfer control unit (transfer control electronic control unit (TC ECU)) 41, which will be described later, varies clamping force of the multi-plate clutches 15l and 15r to appropriately determine torque distribution to the left and right front drive wheels Fl and Fr in case of sudden torque changes during driving on a low-$\mu$ road such as a snow-covered road, starting, sudden acceleration, or the like.

The rear drive unit 1R includes left and right drive motors 12l and 12r. Driving force of the left and right drive motors 12l and 12r is transferred to left and right rear drive wheels Rl and Rr, respectively, through deceleration mechanisms, which are not illustrated. In the embodiment of the disclosure, the drive source 11 and the left and right drive motors 12l and 12r correspond to a drive source.

In the steering system, a steering mechanism 21 such as a rack and pinion mechanism is coupled to the left and right front drive wheels Fl and Fr through tie rods 22. A steering shaft 24 that fixes a steering wheel 23 at an end thereof is coupled to the steering mechanism 21. When a driver turns the steering wheel 23, the left and right front drive wheels Fl and Fr are steered through the steering mechanism 21. An electric power steering (EPS) motor 25 as a steering driver is coupled to a part of the steering shaft 24 close to the steering mechanism 21 through a transfer mechanism, which is not illustrated.

The drive source 11 and the transmission 12 are controlled on the basis of an output control signal and a gearshift control signal output from a power control unit (PW ECU) 42. An EPS control unit (EPS ECU) 43, which is a steering controller, controls assist torque (EPS torque) applied by the EPS motor 25 to the steering shaft 24. Furthermore, a motor control unit (motor ECU) 44 controls outputs of the left and right drive motors 12*l* and 12*r* for the rear wheels.

These control units 41 to 44 are coupled, in a bidirectionally communicable manner, to a driving support system (DSS) control unit (DSS ECU) 45 as a driving force controller that achieves a DSS over, for example, an in-vehicle network employing controller area network (CAN) communication or the like. The ECUs 41 to 45 included in the control system are achieved by a microcontroller including a random-access memory (RAM), a read-only memory (ROM), a rewritable nonvolatile memory (a flash memory or an electrically erasable programmable read-only memory (EEPROM)), and peripheral devices. The ROM stores programs, fixed data, and the like necessary for a central processing unit (CPU) to perform various types of processing. The RAM is provided as a work area of the CPU and temporarily stores various types of data generated by the CPU. The CPU is also called a "microprocessor (MPU)" or a "processor". A graphics processing unit (GPU) or a graph streaming processor (GSP) may be used instead of the CPU. Alternatively, a CPU, a GPU, and a GSP may be selectively combined with one another and used.

Operations performed by the ECUs 41 to 44 are basically controlled in accordance with control signals from the DSS ECU 45. Sensors necessary to control the operations performed by the ECUs 41 to 44 are coupled to an input side of the DSS ECU 45. The sensors include a brake switch 26 as a brake detector that detects depression of a brake pedal by the driver, a wheel velocity sensor 27 as a wheel velocity detector that detects wheel velocities Vw of the drive wheels Fl, Fr, Rl, and Rr, a fore-aft acceleration sensor 28 that detects fore-aft acceleration (G) while the vehicle M is running and, on the basis of the fore-aft acceleration, a surface gradient direction indicating whether the vehicle M is ascending or descending a slope, a vehicle velocity detector 29 that detects a movement velocity of the vehicle M, a steering angle sensor 30 as a steering angle detector that detects steering angles caused when the driver turns the steering wheel 23, a yaw rate sensor 31 as a yaw rate detector that detects yaw rates acting on the vehicle M, and a brake fluid pressure sensor 32 that detects, on the basis of a fluid pressure in a master cylinder, a brake pressure at a time when the driver depresses the brake pedal. When the drive wheels Fl, Fr, Rl, and Rr are collectively referred to in the following description, a generic term "drive wheels Aw" will be used for convenience.

When an automotive navigation system is mounted on the vehicle M and positional information can be obtained from a global navigation satellite system (GNSS) satellite, for example, a vehicle velocity Vv detected by the vehicle velocity detector 29 is estimated from the amount of movement in unit time based on the positional information obtained from the GNSS satellite. Alternatively, the vehicle velocity Vv may be estimated on the basis of changes in acceleration detected by the fore-aft acceleration sensor 28. Alternatively, when a forward recognition unit such as an in-vehicle camera is mounted on the vehicle M, the vehicle velocity Vv may be estimated from the amount of movement of a point of focus in unit time based on information regarding the point of focus detected by the forward recognition unit.

When attempting to stop the vehicle M on a very low-μ surface (a surface with a low coefficient of friction, such as that of a snow-covered road or an icy road), the driver slowly and cautiously depresses the brake pedal to decelerate the vehicle M gradually without letting the wheels lock up and causing slipping. If the very low-μ surface is that of a slope and a weight component (mg·sin θ) of the vehicle M along the slope exceeds a coefficient of static friction μ of the slope due to a surface gradient, however, the wheels lock up and the vehicle M slides down. Even while the vehicle M is sliding down, the driver often attempts to stop the vehicle M by depressing the brake pedal.

Since the wheels have locked up and the vehicle M is slipping, it is difficult to stop the sliding promptly. In addition, while the vehicle M is sliding down and the wheels are unsteerable, the vehicle M might naturally have a yaw rate (hereinafter referred to as a "natural yaw rate") due to a transverse gradient or a split-μ surface of a road, and an orientation of the vehicle M might gradually change. If the DSS ECU 45 detects downward sliding while the driver is attempting to stop the vehicle M on a very low-μ surface, the DSS ECU 45 provides driving support for restoring tire grip, promptly suppressing the downward sliding, and stabilizing the orientation of the vehicle M.

Figure 2:
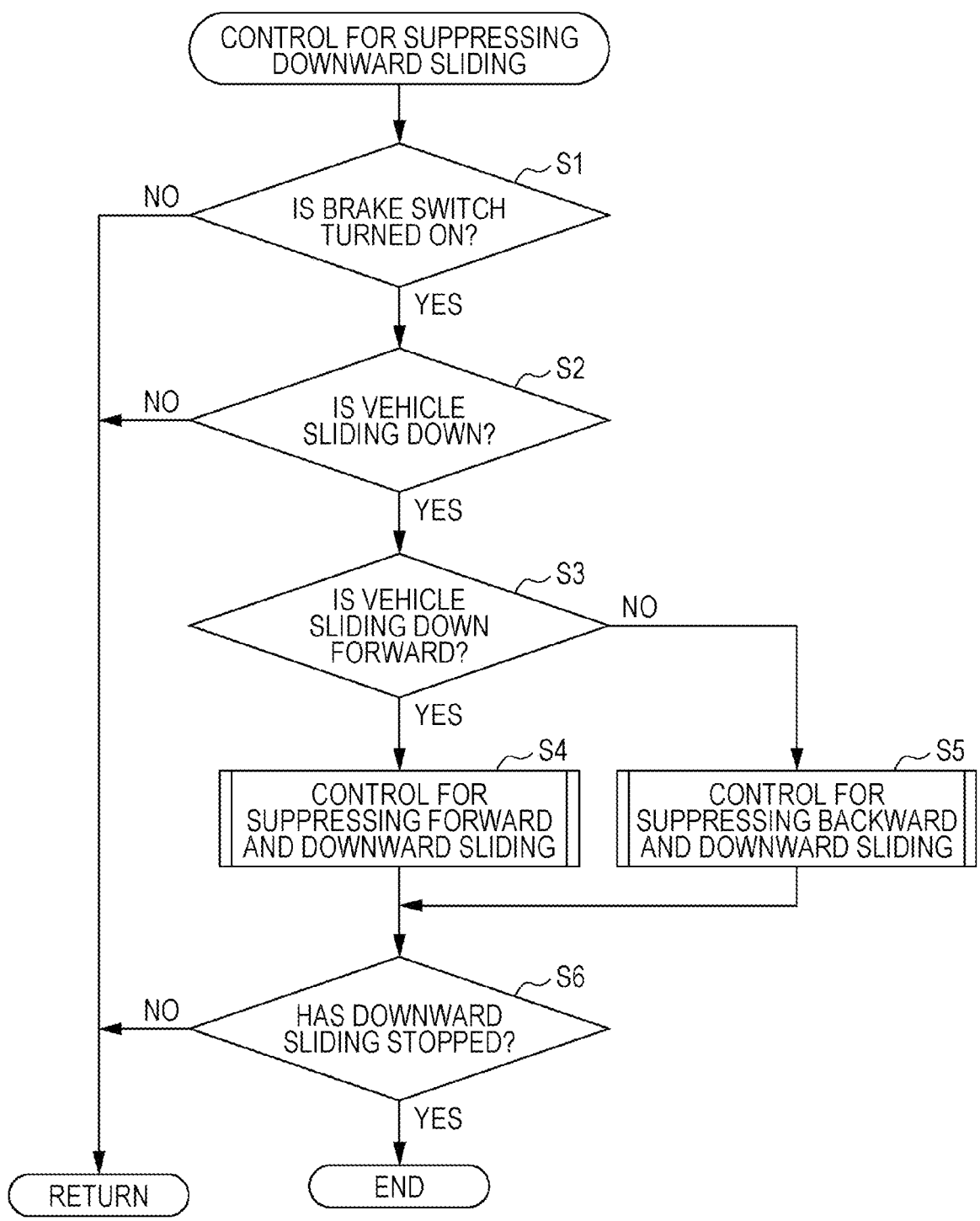
FIG. 2 is a flowchart illustrating a routine for suppressing downward sliding.

In one example, the control for suppressing downward sliding performed by the DSS ECU 45 is achieved in accordance with a routine for suppressing downward sliding illustrated in FIG. 2. In this routine, first, whether the driver is depressing the brake pedal is determined in step S1 on the basis of whether the brake switch 26 is turned on. If the brake switch 26 is turned off, the routine returns to a start. If the brake switch 26 is turned on, it is determined that the driver is depressing the brake pedal, and the routine proceeds to step S2.

In step S2, whether the vehicle M is sliding down is determined on the basis of the surface gradient direction detected by the fore-aft acceleration sensor 28, the wheel velocities Vw of the four drive wheels Fl, Fr, Rl, and Rr detected by the wheel velocity sensor 27, and the vehicle velocity Vv detected by the vehicle velocity detector 29. If the vehicle velocity Vv and the wheel velocities Vw are both 0 [km/h] or substantially the same, it is determined that downward sliding has not occurred, and the routine returns to the start. If the fore-aft acceleration sensor 28 detects a surface gradient direction, that is, if the vehicle M is on a slope, and the wheel velocities Vw are 0 [km/h] but the vehicle velocity Vv exceeds 0 [km/h] (Vv>0), it is determined that the vehicle M is sliding down due to slipping, and the routine proceeds to step S3. Even if small slipping is detected immediately before the vehicle M stops on a very low-μ surface, therefore, it is not determined that the vehicle M is sliding down, when the vehicle M is not on a slope.

In step S3, a sliding direction of the vehicle M is determined on the basis of a fore-aft acceleration direction (surface gradient direction) detected by the fore-aft acceleration sensor 28. That is, if the fore-aft acceleration sensor 28 detects fore-aft acceleration at a time of downhill driving, it is determined that the downward sliding is occurring in a traveling (forward) direction of the vehicle M. If the fore-aft acceleration sensor 28 detects fore-aft acceleration at a time of uphill driving, on the other hand, it is determined that the downward sliding is occurring in a reverse (backward)

direction of the vehicle M. In the embodiment of the disclosure, the processing in step S3 corresponds to a sliding direction determiner.

Figure 6:
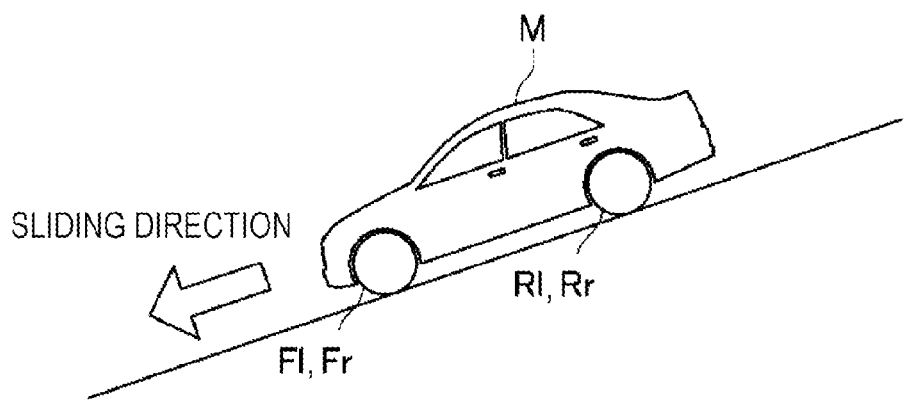
FIG. 6 is a side view illustrating a state where a vehicle is sliding down forward on a slope.

If it is determined that the vehicle M is sliding down forward (refer to FIG. 6), the routine proceeds to step S4, and control for suppressing forward and downward sliding is performed. If it is determined that the vehicle M is sliding down backward (refer to FIG. 7), the routine branches to step S5, and control for suppressing backward and downward sliding is performed. In the embodiment of the disclosure, the processing in steps S2 and S3 corresponds to a downward sliding determiner.

Figure 3:
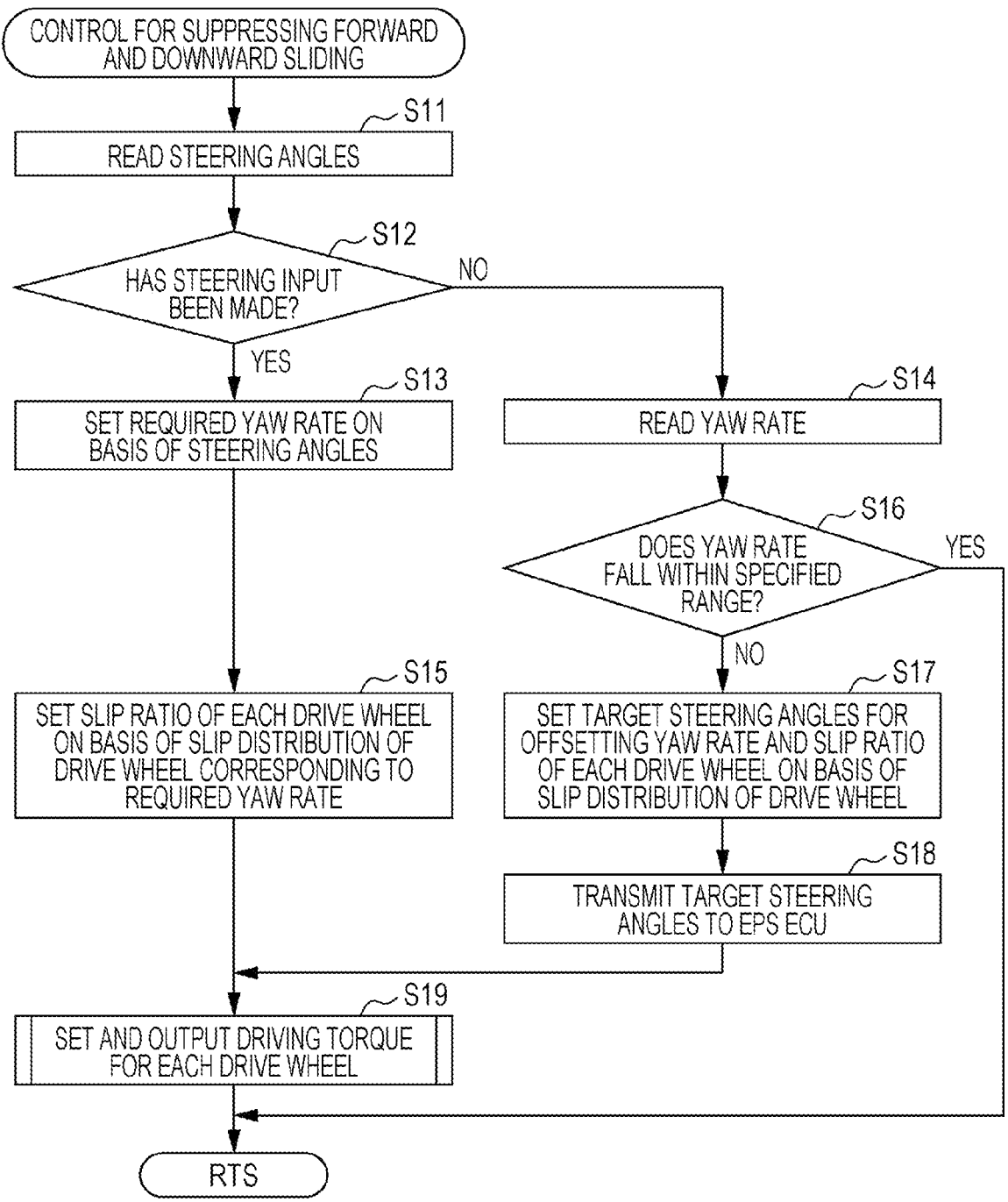
FIG. 3 is a flowchart illustrating subroutine for suppressing forward and downward sliding.

The control for suppressing forward and downward sliding performed in the above-described step S4 is achieved in accordance with a subroutine for suppressing forward and downward sliding illustrated in FIG. 3. The control for suppressing backward and downward sliding performed in step S5 is achieved in accordance with a subroutine for suppressing backward and downward sliding illustrated in FIG. 4.

First, processing in the subroutine for suppressing forward and downward sliding illustrated in FIG. 3 will be described. In step S11 of this subroutine, the steering angles detected by the steering angle sensor 30 are read. The subroutine proceeds to step S12, and, on the basis of the steering angles, whether the driver has made a steering input by turning the steering wheel 23 is determined. If a steering input is detected, the subroutine proceeds to step S13, and if no steering input is detected, that is, if it is determined that the driver is not turning the steering wheel 23, the subroutine branches to step S14.

During the downward sliding, the driver might turn the steering wheel 23 to, for example, restore the orientation of the vehicle M that has turned around or intentionally turn the vehicle M to a certain direction (e.g., toward a snow-covered surface without ruts for a purpose of restoring grip). When the driver is not turning the steering wheel 23, on the other hand, for example, the vehicle M has not turned around (has no yaw rate) and is sliding linearly downward or the driver is too panicked to turn the steering wheel 23.

If a steering input made by the driver is detected, therefore, driving support that follows the driver's intention is performed in steps S13, S15, and S19. If the driver is not turning the steering wheel 23, on the other hand, driving support for stabilizing the orientation of the vehicle M is performed in steps S14, S16, and S19.

If it is determined that the driver has made a steering input and the subroutine proceeds to step S13, a required yaw rate is calculated or set through a map search on the basis of the steering angles detected by the steering angle sensor 30 and the vehicle velocity Vv. The subroutine then proceeds to step S15. Because the vehicle velocity Vv during the downward sliding is low, the vehicle velocity Vv may be a fixed value, instead. In the embodiment of the disclosure, the processing in step S13 and processing in step S24, which will be described later, correspond to a required yaw rate setter.

In step S15, slip ratios λ of the drive wheels Aw are set, using a following expression (1), on the basis the distribution of slip ratios (slip distribution) of all the drive wheels Aw (=Fl, Fr, Rl, and Rr) corresponding to the required yaw rate, and the subroutine proceeds to step S19.

$$\lambda=[(Vv-Vw)/Vv]\cdot 100[\%] \quad (1)$$

That is, when all the drive wheels Aw lock up, lateral force is not generated even if the driver turns the steering wheel 23, because tire grip has not been restored. It is therefore difficult to turn the vehicle M to a desired direction. For this reason, the slip ratio λ of each of the drive wheels Aw is adjusted to make the grip of the drive wheels Aw different from one another and turn the vehicle M to a steering direction intended by the driver.

Figure 10A:
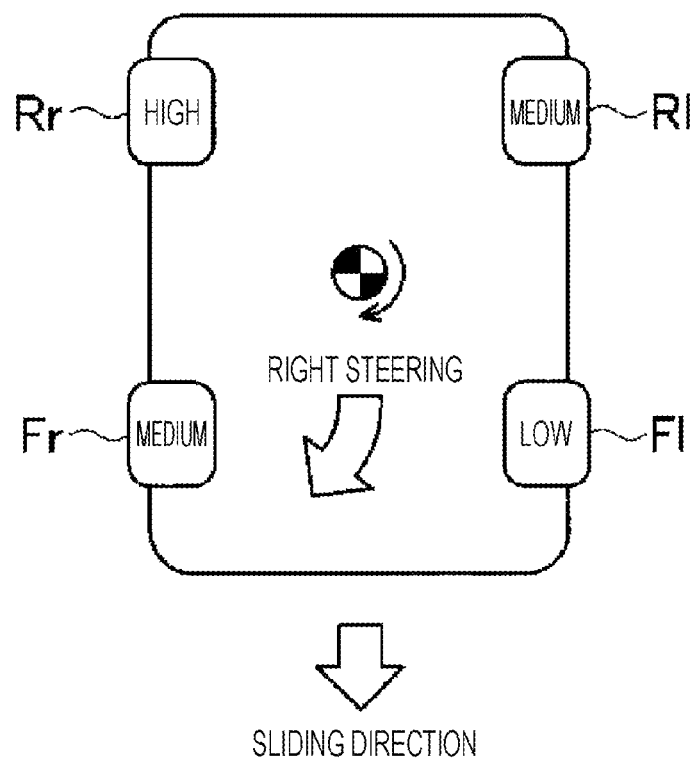
FIG. 10A is a diagram illustrating vehicle behavior based on slip distribution set when the driver turns a steering wheel to the right during forward and downward sliding.
Figure 10B:
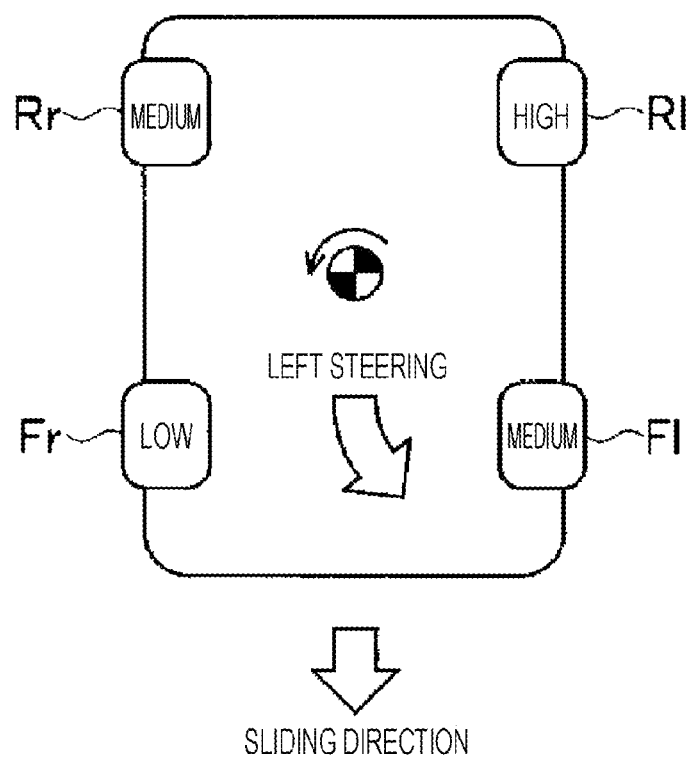
FIG. 10B is a diagram illustrating vehicle behavior based on slip distribution set when the driver turns the steering wheel to the left during forward and downward sliding.

FIG. 8A schematically illustrates the slip distribution of all the drive wheels Aw corresponding to the steering direction intended by the driver during forward sliding. FIG. 10A illustrates vehicle behavior based on slip distribution set when the driver turns the steering wheel 23 to the right, and FIG. 10B illustrates vehicle behavior based on slip distribution set when the driver turns the steering wheel 23 to the left.

When turning the steering wheel 23 to the right during forward and downward sliding, the driver is attempting to turn the vehicle M to the right. Grip is restored, therefore, by making a slip ratio λ of the right rear drive wheel Rr "high" (e.g., λ≈100[%]) to substantially maintain a wheel lockup state, slip ratios λ of the left rear drive wheel Rl and the right front drive wheel Fr "medium" (e.g., λ=70 to 50[%]), and a slip ratio λ of the left front drive wheel Fl "low" (e.g., λ=30[%] or lower). As a result, as illustrated in FIG. 10A, the left front drive wheel Fl, which serves as an outer wheel since the slip ratio λ thereof is the lowest, slowly moves and the drive wheels Rl and Fr, whose slip ratios λ are "medium", follow the left front drive wheel Fl to turn the vehicle M to the right.

Similarly, when turning the steering wheel 23 to the left, the driver is attempting to turn the vehicle M to the left. Contrary to the situation where the driver turns the steering wheel 23 to the right, therefore, grip is restored by making the slip ratio λ of the left rear drive wheel Rl "high" to substantially maintain a wheel lockup state, the slip ratios λ of the right rear drive wheel Rr and the left front drive wheel Fl "medium", and the slip ratio λ of the right front drive wheel Fr "low". As a result, the right front drive wheel Fr, which serves as an outer wheel since the slip ratio λ thereof is "low", slowly moves and the drive wheels Rr and Fl, whose slip ratios are "medium", follow the right front drive wheel Fr to turn the vehicle M to the left.

When step S12 branches to step S14, on the other hand, the natural yaw rate detected by the yaw rate sensor 31 is read, and whether the natural yaw rate falls within a specified range is determined in step S16. Within the specified range, which is a fixed set of values obtained in advance from an experiment or the like, the vehicle M is regarded as sliding down linearly. When a direction of a natural yaw rate is different between right turning and left turning, an absolute value of the natural yaw rate and the specified range are compared with each other.

If it is determined that the natural yaw rate falls within the specified range, the subroutine proceeds to step S6. If a natural yaw rate higher than the specified range is detected, the subroutine proceeds to step S17. In the embodiment of the disclosure, the processing in steps S15 and S17 and processing in step S26 and S28, which will be described later, correspond to a slip ratio setter.

In step S17, target steering angles for offsetting the natural yaw rate are set, and the slip ratio λ of each of the drive wheels Aw is set on the basis of the slip distribution of the drive wheel Aw. The subroutine then proceeds to step S18. The target steering angles are steering angles for generating a yaw rate (opposite yaw rate) whose direction is opposite that of the natural yaw rate acting on the vehicle M and set on the basis of the opposite yaw rate and the vehicle velocity Vv. Because the vehicle velocity Vv during downward sliding is low, the vehicle velocity Vv may be a fixed value, instead.

That is, when all the drive wheels Aw lock up, lateral force is not generated even if the left and right front drive wheels Fl and Fr are steered while setting target steering angles of the left and right front drive wheels Fl and Fr using the DSS ECU 45 and driving the EPS motor 25 using the EPS ECU 43, because tire grip has not been restored. The vehicle M can be turned, however, by making the slip ratio $\lambda$ of an outer wheel "low" to restore grip. For this reason, the slip ratio $\lambda$ of each of the drive wheels Aw is adjusted to make the grip of the drive wheels Aw different from one another. The vehicle M is then turned to a direction in which the opposite yaw rate is generated, and the orientation of the vehicle M is restored to an original driving direction.

Figure 10C:
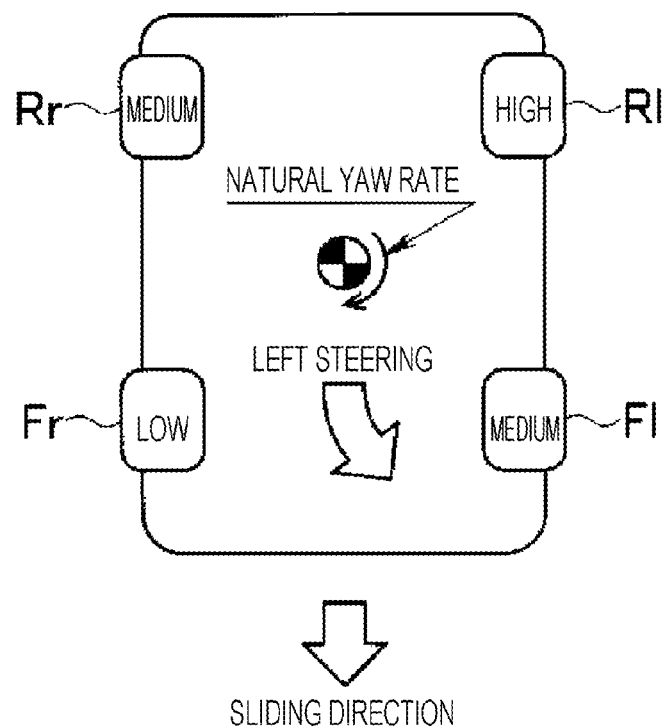
FIG. 10C is a diagram illustrating vehicle behavior based on slip distribution of each wheel and steering control set when a clockwise yaw rate is caused during forward and downward sliding.
Figure 10D:
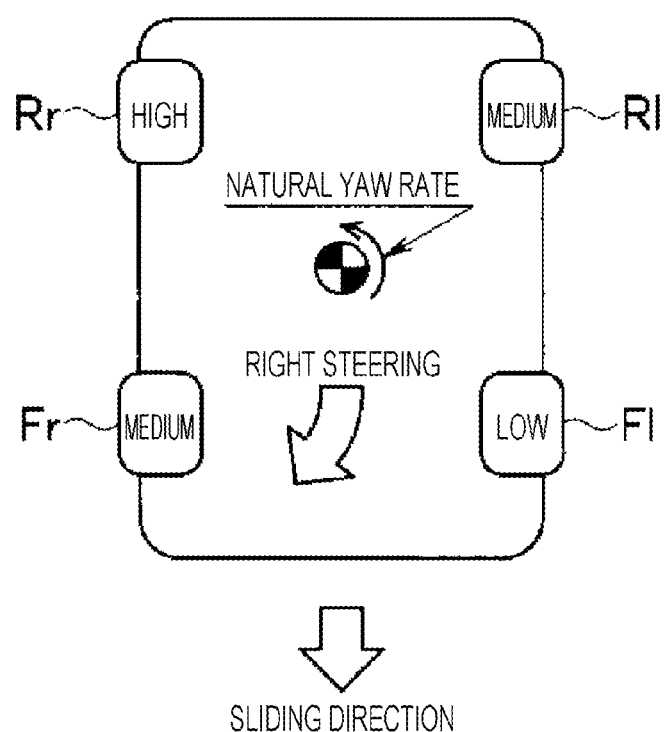
FIG. 10D is a diagram illustrating vehicle behavior based on slip distribution of each wheel and steering control set when a counterclockwise yaw rate is caused during forward and downward sliding.

FIG. 8B schematically illustrates a counter-steering direction and the slip distribution of all the drive wheels Aw for generating an opposite yaw rate when a natural yaw rate is caused on the vehicle M during forward and downward sliding. FIG. 10C illustrates vehicle behavior based on slip distribution set when a clockwise natural yaw rate is caused. FIG. 10D illustrates vehicle behavior based on slip distribution set when a counterclockwise natural yaw rate is caused.

In order to cause an opposite yaw rate when a clockwise natural yaw rate such as that illustrated FIG. 10C is caused on the vehicle M during forward and downward sliding, left steering (counter-steering direction) is set as target steering angles, and the slip ratio $\lambda$ of the right front drive wheel Fr, which uses largest driving force as an outer wheel, is made "low" to restore grip. In order to make the left front drive wheel Fl and the right rear drive wheel Rr follow the right front drive wheel Fr, the slip ratios $\lambda$ of the left front drive wheel Fl and the right rear drive wheel Rr are made "medium". Furthermore, the slip ratio $\lambda$ of the left rear drive wheel Rl is made "high" to substantially maintain a wheel lockup state.

In order to cause an opposite yaw rate when a counterclockwise natural yaw rate such as that illustrated in FIG. 10D is caused on the vehicle M during forward and downward sliding, on the other hand, right steering (counter-steering direction) is set as target steering angles, and the slip ratio $\lambda$ of the left front drive wheel Fl, which uses largest driving force as an outer wheel, is made "low" to restore grip. In order to make the right front drive wheel Fr and the left rear drive wheel Rl follow the left front drive wheel Fl, the slip ratios $\lambda$ of the right front drive wheel Fr and the left rear drive wheel Rl are made "medium". Furthermore, the slip ratio $\lambda$ of the right rear drive wheel Rr is made "high" to substantially maintain a wheel lockup state.

Next, the subroutine proceeds to step S18. Data corresponding to the target steering angles is transmitted to the EPS ECU 43, and the subroutine proceeds to step S19. The EPS ECU 43 calculates a rotation angle of the EPS motor 25 corresponding to the target steering angles and drives the EPS motor 25 using a drive signal indicating the rotation angle. As a result, the EPS motor 25 operates the steering mechanism 21 to steer the left and right front drive wheels Fl and Fr by the set angles, respectively, through the tie rods 22.

When the subroutine proceeds to step S19 from step S15 or S18, on the other hand, driving torque for each of the drive wheels Aw is set and output, and the subroutine proceeds to step S6 illustrated in FIG. 2. The setting and outputting of the driving torque for each of the drive wheels Aw in step S19 is performed in accordance with a subroutine for setting and outputting driving torque illustrated in FIG. 5. Processing in the subroutine will be described later.

Figure 4:
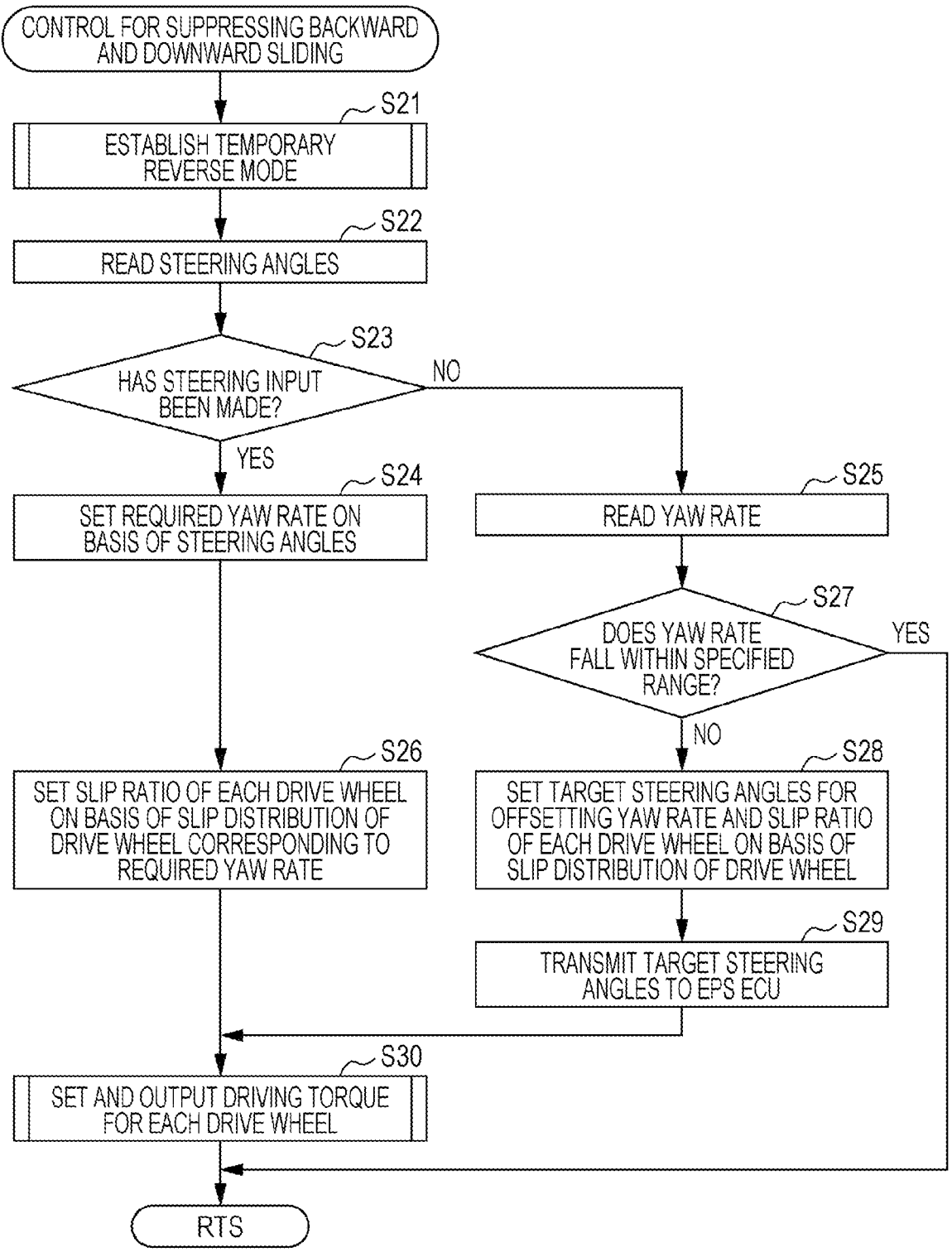
FIG. 4 is a flowchart illustrating a subroutine for suppressing backward and downward sliding.

When step S3 in FIG. 2 branches to step S5 and the subroutine for suppressing backward and downward sliding illustrated in FIG. 4 is performed, first, the DSS ECU 45 establishes a temporary reverse mode, in which a driving mode temporarily switches to a reverse mode, and transmits a mode switch signal to the PW ECU 42 and the motor ECU 44 in step S21.

As a result, the PW ECU 42 and the motor ECU 44 switch the driving mode to the reverse mode and rotate each of the drive wheels Aw in a reverse direction in accordance with required driving torque set in the subroutine for setting and outputting driving torque, which will be described later, illustrated in FIG. 5. The temporary reverse mode is canceled when the driver releases the brake pedal, that is, when the brake switch 26 is turned off. In the embodiment of the disclosure, the processing in step S21 corresponds to a temporary reverse mode establisher.

Next, in step S22, the steering angles detected by the steering angle sensor 30 are read. In step S23, whether the driver has made a steering input by turning the steering wheel 23 is determined on the basis of the steering angles. If a steering input is detected, the subroutine proceeds to step S24, and if no steering input is detected, that is, if it is determined that the driver is not turning the steering wheel 23, the subroutine branches to step S25.

Figure 7:
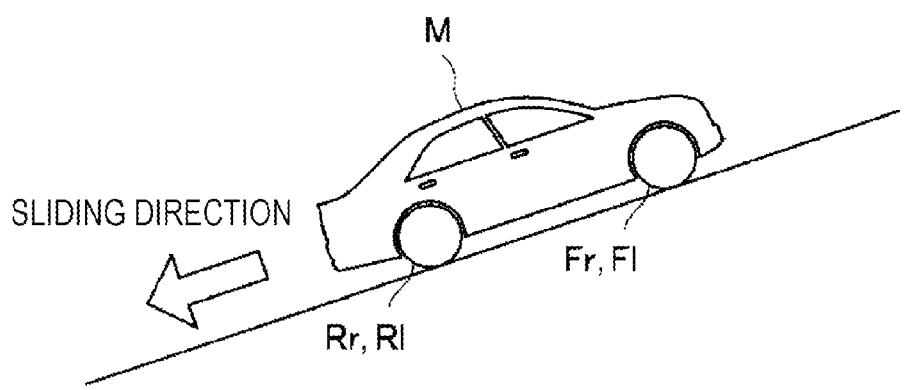
FIG. 7 is a side view illustrating a state where the vehicle is sliding down backward on a slope.

While the vehicle M is sliding down backward as illustrated in FIG. 7, the driver might turn the steering wheel 23 to, for example, restore the orientation of the vehicle M that has turned around or remove the front drive wheels Fl and Fr or the rear drive wheels Rl and Rr of the vehicle M from ruts and move the vehicle M to a position where tires are likely to grip. When the driver is not turning the steering wheel 23, on the other hand, for example, the vehicle M might be sliding down linearly downward or the driver is too panicked to turn the steering wheel 23.

If a steering input made by the driver is detected, therefore, driving support that follows the driver's intention is performed in steps S24, S26, and S30. If the driver is not turning the steering wheel 23, on the other hand, driving support for stabilizing the orientation of the vehicle M is performed in steps S25, S28, S29, and S30.

If it is determined that the driver has made a steering input and the subroutine proceeds to step S24, a required yaw rate is calculated or set through a map search on the basis of the steering angles detected by the steering angle sensor 30 and the vehicle velocity Vv. The subroutine proceeds to step S26. Because the vehicle velocity Vv during the downward sliding is low, the vehicle velocity Vv may be a fixed value, instead.

In step S26, the slip ratio $\lambda$[%] of each of the drive wheels Aw is set on the basis the slip distribution of all the drive wheels Aw corresponding to the required yaw rate, and the subroutine proceeds to step S30. When all the drive wheels Aw lock up, lateral force is not generated. It is therefore difficult to turn the vehicle M to a desired direction. For this reason, the slip ratio $\lambda$ of each of the drive wheels Aw is adjusted, and the vehicle M is turned to a steering direction intended by the driver.

Figure 11A:
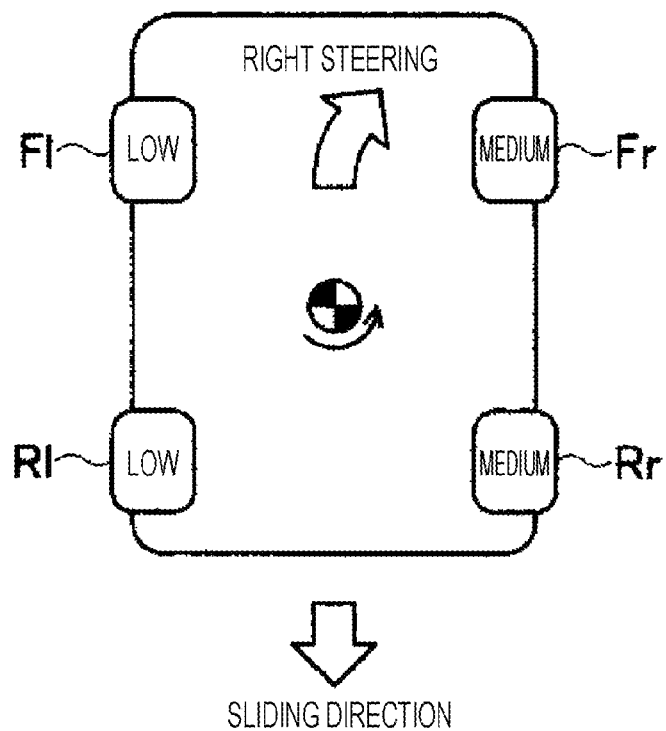
FIG. 11A is a diagram illustrating vehicle behavior based on slip distribution of each wheel set when the driver turns the steering wheel to the right during backward and downward sliding.
Figure 11B:
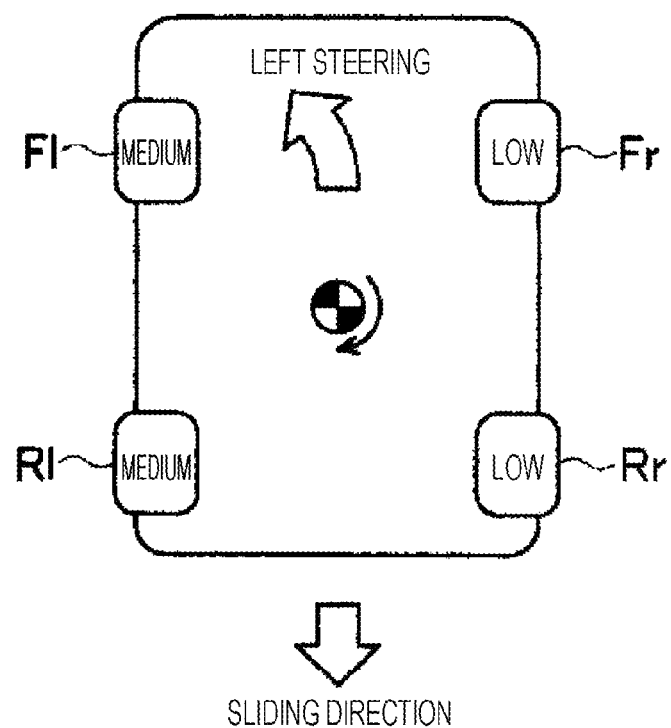
FIG. 11B is a diagram illustrating vehicle behavior based on slip distribution of each wheel set when the driver turns the steering wheel to the left during backward and downward sliding.

FIG. 9A schematically illustrates the slip distribution of each of the drive wheels Aw corresponding to the steering direction intended by the driver during backward sliding. FIG. 11A illustrates vehicle behavior based on slip distribution set when the driver turns the steering wheel 23 to the right, and FIG. 11B illustrates vehicle behavior based on slip distribution set when the driver turns the steering wheel 23 to the left.

When turning the steering wheel 23 to the right during backward and downward sliding, the driver is attempting to turn the vehicle M to the left. The slip ratios λ of the left front drive wheel Fl and the left rear drive wheel Rl, which veer outside, therefore, are made "low" to restore grip. The slip ratios λ of the right front drive wheel Fr and the right rear drive wheel Rr are made "medium" to make the right front drive wheel Fr and the right rear drive wheel Rr follow the left front drive wheel Fl and the left rear drive wheel Rl. The right front drive wheel Fr, which is an inner wheel, might follow the left front drive wheel Fl and the left rear drive wheel Rl more closely if the slip ratio λ thereof is made "high" at this time, but since the right front drive wheel Fr is a steered wheel, the slip ratio λ thereof may be made "medium" to restore a certain degree of grip.

As a result, as illustrated in FIG. 11A, the vehicle M is slowly turned to the left by slowing driving the left front drive wheel Fl and the left rear drive wheel Rl, whose slip ratios λ are "low", and driving the right front drive wheel Fr and the right rear drive wheel Rr, whose slip ratios λ are "medium", such that the right front drive wheel Fr and the right rear drive wheel Rr follow the left front drive wheel Fl and the left rear drive wheel Rl.

Similarly, when turning the steering wheel 23 to the left, the driver is attempting to turn the vehicle M to the right. Contrary to the case where the driver turns the steering wheel 23 to the right, therefore, the slip ratios λ of the right front drive wheel Fr and the right rear drive wheel Rr, which are outside wheels, are made "low" to restore grip. The slip ratios λ of the left front drive wheel Fl and the left rear drive wheel Rl, which are inner wheels, are made "medium" to make the left front drive wheel Fl and the left rear drive wheel Rl follow the right front drive wheel Fr and the right rear drive wheel Rr. In this case, too, the left front drive wheel Fl, which is an inner wheel, is a steered wheel, the slip ratio λ is made not "high" but "medium" to restore a certain degree of grip.

As a result, as illustrated in FIG. 11B, the vehicle M is slowly turned to the right by slowing driving the right front drive wheel Fr and the right rear drive wheel Rr, whose slip ratios λ are "low", and driving the left front drive wheel Fl and the left rear drive wheel Rl, whose slip ratios λ are "medium", such that the left front drive wheel Fl and the left rear drive wheel Rl follow the right front drive wheel Fr and the right rear drive wheel Rr.

When step S23 branches to step S25, on the other hand, the natural yaw rate detected by the yaw rate sensor 31 is read, and, in step S27, whether the natural yaw rate falls within the specified range is determined. If it is determined that the natural yaw rate falls within the specified range, the subroutine proceeds to step S6 illustrated in FIG. 2. If the detected natural yaw rate is higher than the specified range, the subroutine proceeds to step S28.

In step S28, target steering angles for offsetting the natural yaw rate and the slip ratio λ of each of the drive wheels Aw based on the slip distribution of the drive wheel Aw are set, and the subroutine proceeds to step S29. The target steering angles are steering angles for generating a yaw rate (opposite yaw rate) whose direction is opposite that of the natural yaw rate acting on the vehicle M and set on the basis of the opposite yaw rate and the vehicle velocity Vv. Since the vehicle velocity Vv during downward sliding is low, the vehicle velocity Vv may be a fixed value, instead.

That is, when all the drive wheels Aw lock up, lateral force is not generated even if the left and right front drive wheels Fl and Fr are steered while setting target steering angles of the left and right front drive wheels Fl and Fr using the DSS ECU 45 and driving the EPS motor 25 using the EPS ECU 43, because tire grip has not been restored. The vehicle M can be turned, however, by making the slip ratios λ of the outer wheels "low" to restore grip. For this reason, the slip ratio λ of each of the drive wheels Aw is adjusted to make the grip of the drive wheels Aw different from one another. The steered wheels of the vehicle M are then turned to a direction in which the opposite yaw rate is generated, and the orientation of the vehicle M is restored to an original driving direction.

Figure 11C:
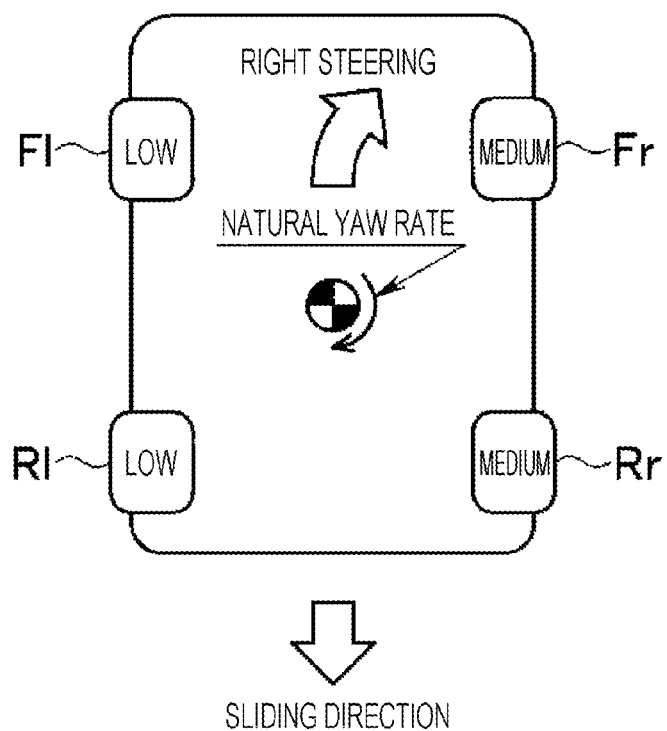
FIG. 11C is a diagram illustrating vehicle behavior based on slip distribution of each wheel and steering control set when a clockwise yaw rate is caused during backward and downward sliding.
Figure 11D:
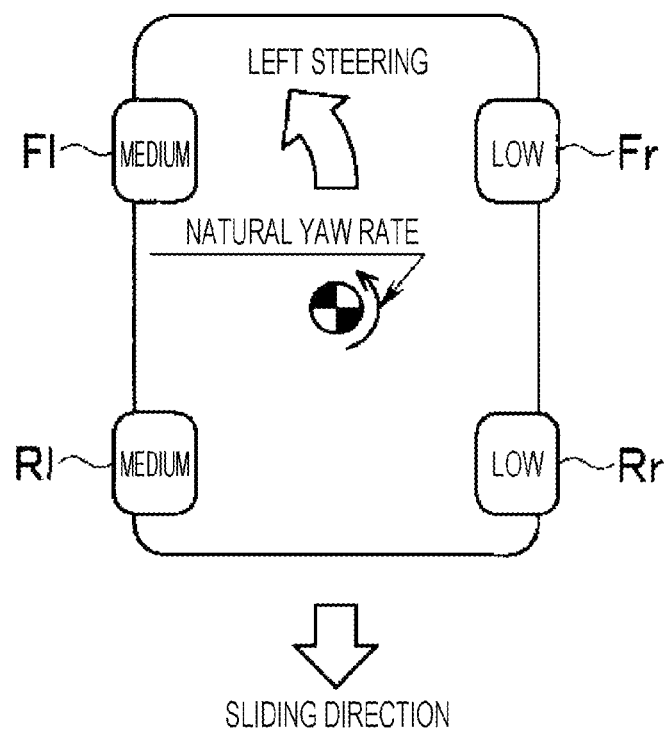
FIG. 11D is a diagram illustrating vehicle behavior based on slip distribution of each wheel and steering control set when a counterclockwise yaw rate is caused during backward and downward sliding.

FIG. 9B schematically illustrates a steering direction and the slip distribution of all the drive wheels Aw for generating an opposite yaw rate when a natural yaw rate is caused on the vehicle M during backward and downward sliding. FIG. 11C illustrates vehicle behavior based on slip distribution set when a clockwise natural yaw rate is caused. FIG. 11D illustrates vehicle behavior based on slip distribution set when a counterclockwise natural yaw rate is caused.

In order to cause an opposite yaw rate when a clockwise natural yaw rate is caused on the vehicle M during backward and downward sliding, right steering is set as target steering angles, and the slip ratios λ of the left front drive wheel Fl and the left rear drive wheel Rl, which use largest driving force as outer wheels, are made "low" to restore grip. In order to make the right front drive wheel Fr and the right rear drive wheel Rr follow the left front drive wheel Fl and the left rear drive wheel Rl, the slip ratios λ of the right front drive wheel Fr and the right rear drive wheel Rr are made "medium". On the other hand, as illustrated in FIG. 11D, in order to cause an opposite yaw rate when a counterclockwise natural yaw rate is caused on the vehicle M during backward and downward sliding, left steering is set as target steering angles, and the slip ratios λ of the right front drive wheel Fr and the right rear drive wheel Rr, which use largest driving force as outer wheels, are made "low" to restore grip. In order to make the left front drive wheel Fl and the left rear drive wheel Rl follow the right front drive wheel Fr and the right rear drive wheel Rr, the slip ratios λ of the left front drive wheel Fl and the left rear drive wheel Rl are made "medium".

Next, the subroutine proceeds to step S29. Data corresponding to the target steering angles is transmitted to the EPS ECU 43, and the subroutine proceeds to step S30. The EPS ECU 43 calculates a rotation angle of the EPS motor 25 corresponding to the target steering angles and drives the EPS motor 25 using a drive signal indicating the rotation angle. The EPS motor 25 then operates the steering mechanism 21 to steer the left and right front drive wheels Fl and Fr by the set angles, respectively, through the tie rods 22. When the subroutine proceeds to step S30 from step S26 or S29, on the other hand, driving torque for each of the drive wheels Aw is set and output, and the subroutine proceeds to step S6 illustrated in FIG. 2.

Figure 5:
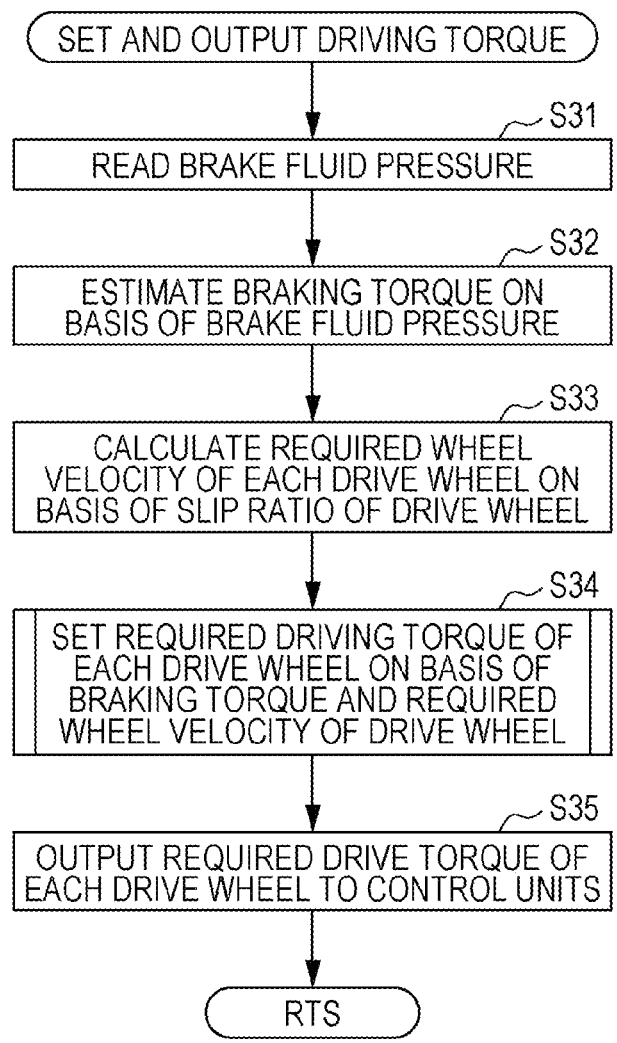
FIG. 5 is a flowchart illustrating a subroutine for setting and outputting driving torque.

The setting and outputting of driving torque for each of the drive wheels Aw in step S19 illustrated in FIG. 3 or step S30 illustrated in FIG. 4 is performed in accordance with the subroutine for setting and outputting driving torque illustrated in FIG. 5. First, in step S31, the DSS ECU 45 reads the brake fluid pressure detected by the brake fluid pressure sensor 32 and, in step S32, estimates braking torque applied to each of the drive wheels Aw on the basis of the brake fluid pressure. In the embodiment of the disclosure, the processing in steps S31 and S32 corresponds to a braking torque estimator.

Next, the subroutine proceeds to step S33, and required wheel velocity Vw of each of the drive wheels Aw is calculated, using the above-described expression (1), on the basis of the slip ratio λ of the drive wheel Aw. The subroutine proceeds to step S34, and required driving torque of each of the drive wheels Aw is set on the basis of the braking torque and the required wheel velocity Vw of the drive wheel Aw. The subroutine then proceeds to step S35. That is, in step S34, the DSS ECU 45 sets required driving torque for rotating the tire of each of the drive wheels Aw against the braking torque applied to the drive wheel Aw. In the embodiment of the disclosure, the processing in steps S33 and S34 corresponds to a driving torque setter.

In step S35, the DSS ECU 45 outputs the required driving torque set for each of the drive wheels Aw to the control units 41 to 44, and the subroutine proceeds to step S6 illustrated in FIG. 2.

The PW ECU 42 then sets an output of the drive source 11 and a gear ratio of the transmission 12 on the basis of the required driving torque of the left and right front drive wheels Fl and Fr. The T/C ECU 41 adjusts the clamping force of the left and right multi-plate clutches 15*l* and 15*r* provided for the front differential 13 to set wheel velocities of the left and right front drive wheels Fl and Fr. Furthermore, the motor ECU 44 sets driving torque of the left and right drive motors 12*l* and 12*r* on the basis of the required driving torque to set wheel velocities of the left and right rear drive wheels Rl and Rr. As a result of this control, the tire of each of the drive wheels Aw is slowly rotated at a wheel velocity corresponding to the slip ratio λ, and desired grip is restored. As a result, the vehicle M can be guided to a direction intended by the driver. The driver, therefore, is less likely to be panicked by downward sliding, and the driver's anxiety can be reduced.

When the routine proceeds to step S6 after the control for suppressing forward and downward sliding in step S4 or the control for suppressing backward and downward sliding in step S5 illustrated in FIG. 2 is performed, the DSS ECU 45 reads the vehicle velocity Vv detected by the vehicle velocity detector 29 and determines whether the downward sliding of the vehicle M has stopped. If the DSS ECU 45 determines that the downward sliding has not yet stopped, the routine returns to the start. If the DSS ECU 45 determines that the downward sliding of the vehicle M has stopped, the routine ends. If the driver releases the brake pedal (the brake switch is turned off), the routine returns to the start in step S1, and the control for suppressing downward sliding is canceled.

As described above, according to the embodiment, even if downward sliding occurs when the driver stops the vehicle M on a slope having a low-μ surface but the driver keeps depressing the brake pedal and the wheels remain locking up, the DSS ECU 45 outputs driving torque corresponding to a certain slip ratio λ to each of the drive wheels Aw against braking torque that is causing the wheel lockup. Tire grip, therefore, is restored, and the vehicle M can be guided to a direction intended by the driver. As a result, the driver is less likely to be panicked by downward sliding of the vehicle M, and the driver's anxiety can be reduced.

If a natural yaw rate is detected during downward sliding of the vehicle M, the DSS ECU 45 causes an opposite yaw rate for offsetting the natural yaw rate by adjusting the slip ratio λ of each of the drive wheels Aw and steering angles of the left and right front drive wheels Fl and Fr, which are the steered wheels, and corrects the orientation of the vehicle M during the downward sliding. Even if the driver is too panicked to turn the steering wheel, therefore, the vehicle M can maintain a stable orientation, which gives the driver a greater sense of security.

The disclosure is not limited to the above embodiment, and, for example, the left and right front drive wheels Fl and Fr may be independently driven by left and right drive motors, respectively, instead. In this case, the drive source 11, the transmission 12, the front differential 13, and the T/C ECU 41 are not necessary, and the PW ECU 42 controls the left and right driving motors.

The DSS ECU 45 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the DSS ECU 45. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A driving support apparatus to be applied to a vehicle, the driving support apparatus comprising:
   a drive source configured to give driving force to each of drive wheels of the vehicle, each of the drive wheels being capable of being independently driven, the drive wheels including front wheels and rear wheels of the vehicle;
   a brake detector configured to detect depression of a brake pedal of the vehicle;
   a vehicle velocity detector configured to detect vehicle velocity of the vehicle;
   a wheel velocity detector configured to detect wheel velocity of each of the drive wheels; and
   a driving force controller configured to control the driving force for each of the drive wheels,
   wherein the driving force controller comprises
   a downward sliding determiner configured to, in a case where the depression of the brake pedal is detected by the brake detector, determine whether the vehicle is sliding down, on a basis of a relationship between the wheel velocity and the vehicle velocity,
   a braking torque estimator configured to estimate, in a case where the downward sliding determiner determines that the vehicle is sliding down, braking torque acting on each of the drive wheels,
   a slip ratio setter configured to set, in a case where the downward sliding determiner determines that the vehicle is sliding down, a slip ratio of each of the drive wheels on a basis of slip distribution set in advance, and
   a driving torque setter configured to set, on a basis of the slip ratio of each of the drive wheels set by the slip ratio setter, driving torque for driving each of the drive wheels against the braking torque estimated by the braking torque estimator.

2. The driving support apparatus according to claim 1, further comprising:
   a steering angle detector configured to detect a steering angle caused by a steering wheel operation performed by a driver who drives the vehicle, wherein the driving force controller further comprises a required yaw rate setter configured to set a required yaw rate from the driver on a basis of the steering angle detected by the steering angle detector, and wherein the slip ratio setter is configured to set a slip ratio of each of the drive wheels corresponding to the required yaw rate set by the required yaw rate setter.

3. The driving support apparatus according to claim 2, further comprising:

a yaw rate detector configured to detect a yaw rate acting on the vehicle; and a steering motor configured to drive a steering wheel of the vehicle, wherein, in a case where the steering angle detector does not detect the steering angle and the yaw rate detector detects the yaw rate, the slip ratio setter is configured to drive the steering motor by a target steering angle for offsetting the yaw rate.

4. The driving support apparatus according to claim 2, wherein the slip ratio setter is configured to set, in a case where the vehicle is steered, the slip ratio of an outer steered wheel among the drive wheels to be lowest.

5. The driving support apparatus according to claim 3, wherein the slip ratio setter is configured to set, in a case where the vehicle is steered, the slip ratio of an outer steered wheel among the drive wheels to be lowest.

6. The driving support apparatus according to claim 1, wherein the driving force controller comprises a sliding direction determiner configured to determine, in a case where the downward sliding determiner determines that the vehicle is sliding down, a sliding direction of the vehicle, and a temporary reverse mode establisher configured to, in a case where the sliding direction determiner determines that the vehicle is sliding down backward, establish a temporary reverse mode and rotate each of the drive wheels in a reverse direction with respect to a rotational direction of each of the drive wheels upon the vehicle traveling forward.

7. The driving support apparatus according to claim 2, wherein the driving force controller comprises a sliding direction determiner configured to determine, in a case where the downward sliding determiner determines that the vehicle is sliding down, a sliding direction of the vehicle, and a temporary reverse mode establisher configured to, in a case where the sliding direction determiner determines that the vehicle is sliding down backward, establish a temporary reverse mode and rotate each of the drive wheels in a reverse direction with respect to a rotational direction of each of the drive wheels upon the vehicle traveling forward.

8. The driving support apparatus according to claim 3, wherein the driving force controller comprises a sliding direction determiner configured to determine, in a case where the downward sliding determiner determines that the vehicle is sliding down, a sliding direction of the vehicle, and a temporary reverse mode establisher configured to, in a case where the sliding direction determiner determines that the vehicle is sliding down backward, establish a temporary reverse mode and rotate each of the drive wheels in a reverse direction with respect to a rotational direction of each of the drive wheels upon the vehicle traveling forward.

9. The driving support apparatus according to claim 4, wherein the driving force controller comprises a sliding direction determiner configured to determine, in a case where the downward sliding determiner determines that the vehicle is sliding down, a sliding direction of the vehicle, and a temporary reverse mode establisher configured to, in a case where the sliding direction determiner determines that the vehicle is sliding down backward, establish a temporary reverse mode and rotate each of the drive wheels in a reverse direction with respect to a rotational direction of each of the drive wheels upon the vehicle traveling forward.

10. The driving support apparatus according to claim 5, wherein the driving force controller comprises a sliding direction determiner configured to determine, in a case where the downward sliding determiner determines that the vehicle is sliding down, a sliding direction of the vehicle, and a temporary reverse mode establisher configured to, in a case where the sliding direction determiner determines that the vehicle is sliding down backward, establish a temporary reverse mode and rotate each of the drive wheels in a reverse direction with respect to a rotational direction of each of the drive wheels upon the vehicle traveling forward.

11. A driving support apparatus to be applied to a vehicle, the driving support apparatus comprising:

one or more of an electric motor and an engine configured to give driving force to each of drive wheels of the vehicle, each of the drive wheels being capable of being independently driven;

a brake sensor configured to detect depression of a brake pedal of the vehicle;

circuitry configured to receive or detect vehicle velocity of the vehicle, receive or detect wheel velocity of each of the drive wheels, control the driving force for each of the drive wheels, in a case where the depression of the brake pedal is detected by the brake sensor, determine whether the vehicle is sliding down, on a basis of a relationship between the wheel velocity and the vehicle velocity, estimate, in a case where it is determined that the vehicle is sliding down, braking torque acting on each of the drive wheels, set, in a case where it is determined that the vehicle is sliding down, a slip ratio of each of the drive wheels on a basis of slip distribution set in advance, and set, on a basis of the set slip ratio of each of the drive wheels, driving torque for driving each of the drive wheels against the estimated braking torque.

* * * * *